United States Patent [19]

Reiniger

[11] Patent Number: 4,704,698
[45] Date of Patent: Nov. 3, 1987

[54] METHOD FOR THE SYNCHRONIZATION OF A MOVEABLE MATERIAL WEB AND AN OPTICAL DEFLECTION PATH

[75] Inventor: Jurgen Reiniger, Bad Vilbel, Fed. Rep. of Germany

[73] Assignee: Linotype GmbH, Fed. Rep. of Germany

[21] Appl. No.: 735,936

[22] Filed: May 20, 1985

[30] Foreign Application Priority Data

May 23, 1984 [DE] Fed. Rep. of Germany ....... 3419288

[51] Int. Cl.$^4$ ...................... B41B 19/00; G02B 27/17
[52] U.S. Cl. .................................... 364/523; 346/108; 346/160; 358/285; 358/293; 364/518
[58] Field of Search ................ 364/518, 523; 358/285, 358/293, 296; 355/67; 350/6.1; 250/235, 236; 346/107, 108, 160

[56] References Cited

U.S. PATENT DOCUMENTS

| 3,566,034 | 2/1971 | Brouwer | 358/293 |
| 3,848,087 | 11/1974 | Carrell | 346/108 |
| 4,204,233 | 5/1980 | Swager | 346/108 |
| 4,280,145 | 4/1981 | Norrell | 358/285 |
| 4,325,086 | 4/1982 | Sato et al. | 358/285 |
| 4,426,149 | 1/1984 | Kuenmel et al. | 355/8 |
| 4,441,126 | 4/1984 | Greenig et al. | 358/293 |
| 4,541,061 | 9/1985 | Schoon | 364/518 |
| 4,578,689 | 3/1986 | Spencer et al. | 346/108 |
| 4,586,057 | 4/1986 | Schoon | 346/108 |
| 4,601,568 | 7/1986 | Takano et al. | 355/8 |

Primary Examiner—Errol A. Krass
Assistant Examiner—Daniel W. Juffernbruch
Attorney, Agent, or Firm—A. Jose Cortina; W. F. Thornton

[57] ABSTRACT

The invention relates to an improvement in a method for the synchronization of a material web, particularly a photosensitive material web in a photo typesetting process. Typically, an optical path is transverse to the direction of motion of a material web normally transportable with an approximately constant transport speed. The web is deflected into deflection lines, and if necessary scanned, to have images exposed. The transport speed and the deflection speed are controllable by common clock pulses. At the beginning of each deflection line, a reference signal (SOL) for time and deflection position is generated. In order to retain, in case of an interruption of the scanning, the regular scanning structure of the scanning on the material web, the following steps are provided as an improvement. In case of an interruption of the scanning, reference signals are generated while line-wise deflection of the optical path is continued. The material web beginning with a first selected reference signal after the interruption is slowed down by n clock pulses to standstill. Beginning with a subsequent reference signal, the material web is accelerated by n clock pulses to an identical return speed opposed to the transport speed. Subsequently it is reset by p clock pulses with the return speed up to a subsequent reference signal. Starting from the last-mentioned reference signal, the material web is slowed down by n clock pulses to standstill. After a variable interval up to a reference signal, the material web is accelerated by n clock pulses to the transport speed and subsequently, by p clock pulses up to a following reference signal, is passed with the transport speed into a scanning position which is equal to the scanning position with the first selected reference signal.

4 Claims, 3 Drawing Figures

METHOD FOR THE SYNCHRONIZATION OF A MOVEABLE MATERIAL WEB AND AN OPTICAL DEFLECTION PATH

The invention relates to a method and apparatus for the synchronization of a material web, particularly a photosensitive material web in a photo typesetting process, with an optical deflection path transverse to the direction of the web transport.

A material web moved with an approximately constant speed and a light beam deflection movement essentially perpendicular thereto of a deflection system are to be synchronized in input scanners or output scanners so that the material web is scanned with the beam deflection lines provided as rectilinear as possible and at a constant distance relative to each other. Particularly when typesetting typographic characters, where the photosensitive material is scanned by a light beam that is pixel frequency modulated corresponding to image spots, i.e. is image-wise exposed, it is important that the beam to web synchronization is exact because even small deviations of either shape or position of the deflection lines projected on the web material may result in esthetic disturbances.

To this end, exact control of the deflection speed of a deflection system, particularly of a polygon mirror, as well as of the drive speed of the photosensitive material web, has to be provided, the reference values of which are deducted from a common clock pulse. In this way, the movements of the deflection system and of the drive of the photo sensitive material web may sufficiently be exactly correlated when these movements have stabilized after a starting phase.

Even in case of highly sophisticated digital speed controls coupled with one another, the next scanning along a deflection line, after interruption of the scanning of the material web, cannot be simply realized so that the regular scanning structure is maintained on the material web; and the desired geometric correlation is then lost. Interruptions of the scanning process occur, for instance, in photo typesetting when a computer cannot, for a certain time, provide the data for the pixel modulation of the scanning beam.

SUMMARY OF THE INVENTION

It is therefore an object of the present invention to provide a method for the synchronization of an approximately constant transport speed photosensitive material web in a phototypesetting process, wherein an optical path is deflected into deflection lines which are relatively transverse to the direction of motion of the material web, and wherein the web is scanned (image-wisely exposed) while the web transport speed and the optical path deflection speed are controllable by common clock pulses. At the beginning of each path deflection line a reference signal (S0L) for time and deflection position is generated wherein after an interruption of the scanning, the latter is so resumed such that the regular scanning structure of the scannings on the material web is maintained. This means that after an interruption, the scanning should again start at a defined location (scanning position) on the material web at the speeds of the stabilized state of the deflection movement and of the drive of the material web.

The method according to the present invention starts from the fact that in case of an interruption of the scanning, or the image-wise exposure, the deflection movement, particularly of a polygon mirror, which is exactly speed-controlled will continue while the advance movement of the material web is stopped and resumed. Reference signals generated during the deflection movement for time and deflection position, which are generated at a defined position of each deflection line and normally serve as the start signals for scanning along the deflection line, are used for the positioning of the web material during the period of the interruption and synchronization with the deflection movement at a determinable point prior to the termination of the period of interruption. During the time intervals defined by the reference signals, preadjusted defined retardation and acceleration processes including advance and return movement of the material web go on which are precisely controlled by the clock pulses. In the control of these processes, reference is made to a selected first reference signal which normally signals the start of the following scanning in a deflection line on the material web. In this case, the material web is first definedly slowed down then is contrary to the transport direction definedly accelerated beyond standstill, until returned to a constant return speed and finally definedly slowed down to a standstill. In this determined waiting position, the material web may remain during a variable waiting time, i.e. any arbitrary number of time intervals limited by the reference signals, until during an advance time also predetermined by the time intervals, the web is definedly accelerated to the constant transport speed and at this speed, with a desired correlation between deflection movement and transport movement, again reaches the scanning position on the material web. During the defined slowing down and acceleration, all retardation and acceleration distances are suitably equal in order to maintain the conditions for the run-in into the next scanning position useable for scanning after an interruption of the scanning. To this end, path increment signals controlling the retarding and the accelerating depending on the clock pulses are counted and used for the control. By referring to the first selectable scanning position at the beginning of a scanning interruption, the motor and drive errors have no impact on the exactness of the readjustment of this scanning position, which is therefore obtained with a very great exactness at the end of the interruption.

If the line-wise deflection movement of the optical path is obtained by means of a polygon mirror having a plurality of reflective faces, according to the invention, after the interruption of the scanning, that reflective face resumes the scanning, which had scanned last before the interruption. In this way, tolerance differences in the alignment of the reflective faces in the mirror polygon cannot disadvantageously affect the exactness and the reproduceability of the scanning. By this measure also according to the invention, the control means for the accelerating and retarding need only fulfill a simple linear ramp function and the mechanical means for the transport of the web material are not stressed by acceleration peaks.

A particularly suitable apparatus for the execution of the method of the invention which excels by its relative low costs, is also disclosed herein.

BRIEF DESCRIPTION OF THE DRAWINGS

The invention will now be more fully explained based on a drawing consisting of 3 Figures which refer to an exemplified embodiment.

DETAILED DISCUSSION OF THE INVENTION

Figure 1:
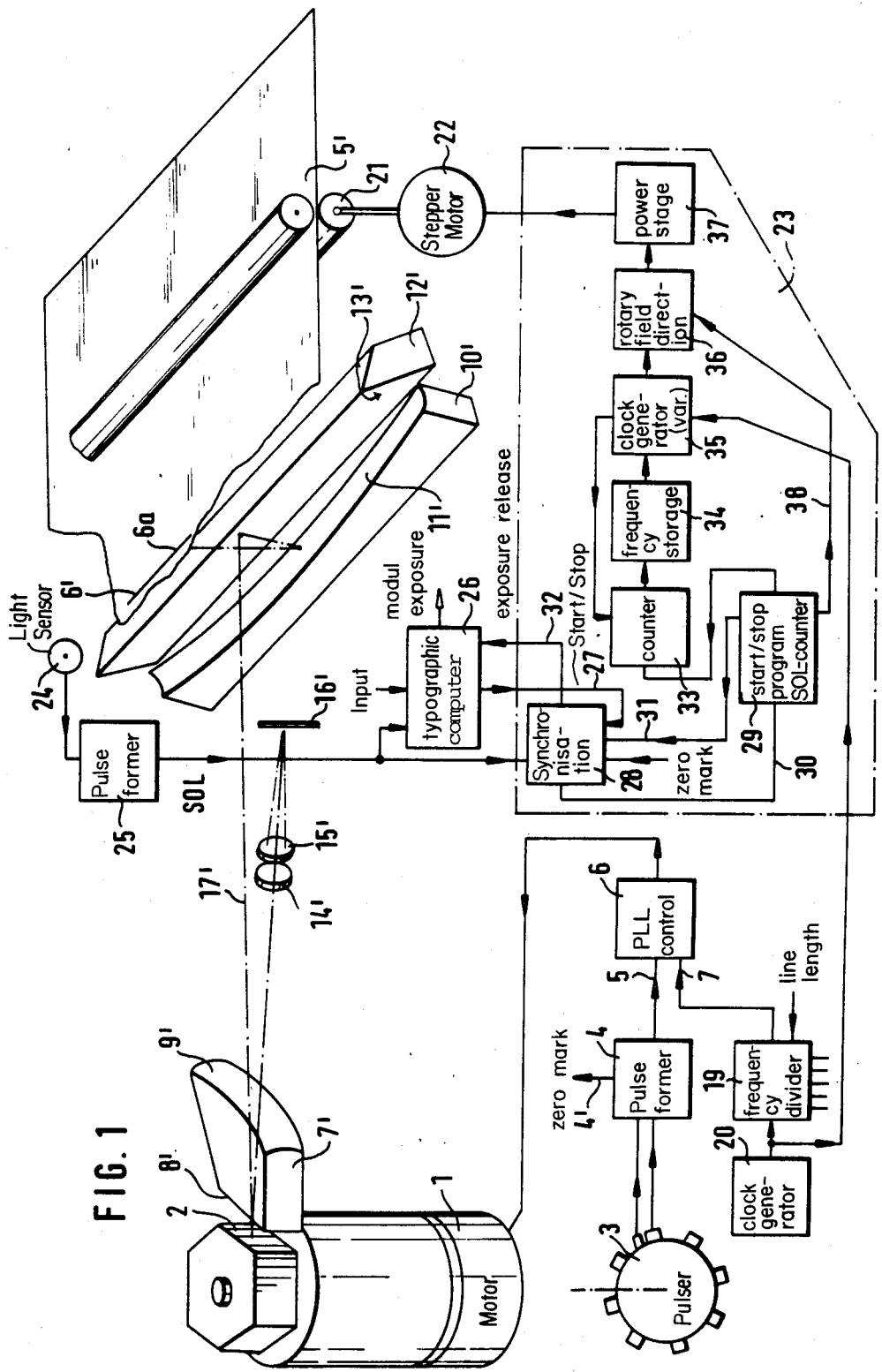
FIG. 1 is a very simplified system including a beam path and a block diagram of a typographic typesetter.

In FIG. 1, a flat-bed deflection system includes as the optical system a polygon mirror 2 having six rotatable reflective faces each staggered at 120° relative to the other. The polygon mirror is driven by a motor 1.

In the beam path between polygon mirror 2 and a flat deflection plane 5', which in a typographic typesetting machine may be represented by a photosensitive material web 5', there is provided the optical system for the projection of a collimated beam via the rotatable reflective faces of the mirror 2 into deflection plane 5', and for the linearization of the relation between a deflection angle corresponding to the rotation angle of the polygon and the position of the beam projected into a deflection line 6' on the deflection plane 5'.

The optical system includes, in the vicinity of the polygon 2, an aplanatic single lens 7' having an approximately flat face 8' facing the polygon and a second spherically-convex face 9' facing the deflection plane.

Then follows, in the further course of the beam path between the polygon 2 and the deflection plane 5', a field-flattening mirror 10' having a spherical reflective face 11'. The spherical reflective face 11' is, on one side, directed towards the deflection plane and at the same time towards an interposed deflection line mirror 12' having a flat reflective face 13', which again points to the spherically-convex face 9' of the aplanatic single lens.

The deflection system described includes, outside of the above described position of the system, in the beam path an additional objective lens 14' and a dispersing lens 15' serving, inter alia, for the precorrection of the spherical abberation of the deflection system.

Starting from an intermediate image plane 16' into which an image spot of a typographic character may be projected by commonly known optical means, particularly by a decollimator lens (not shown), the beam passes through dispersing lens 15' and objective lens 14', the spherically-convex face 9' of the aplanatic single lens 7' and emerges from its approximately flat face 8' as a beam of collimated light. Thus the beam impinges onto the rotatable reflective face of polygon mirror 2 and corresponding to the momentary rotational position of the polygon is reflected back into the aplanatic single lens 7' and is projected, after the exit from its spherically-convex face 9' at a controlled position 6a within deflection line 6'. The following other optical elements of the deflection system add correctively to focusing. The beam 17' emanating from the spherically-convex face 9' into the direction to the deflection plane is reflected via the plane reflective face 13' of the deflection line mirror 12' into the spherically reflective face 11' of the field leveling mirror 10' and, completely focused by it, is directed into position 6a in the deflection line. The deflection line mirror 12' separates, in this case, the beam emanating from the aplanatic single lens 7' from the beam reflected from the field flattening mirror 10'.

A digital control device including a rotary angle pulse generator 3, the rotary angle pulses of which are fed, via a pulse former 4 into an actual value input 5 of a digital PLL control 6, serves for the exactly speed-controlled driving of motor 1 and polygon mirror 2. The rotary angle pulse generator 3 generates, in addition, a zero mark signal in a single defined rotary position at the output 4' of pulse former 4. A reference value input 7 of the PLL control 6 is fed with pulses stemming, geared down by an adjustable frequency divider 19, from a clock generator 20. In accordance with the adjustment of the frequency divider 19, the PLL control 6 controls a constant speed of the motor 1 and of the polygon mirror 2 the reflective faces of which deflect the beam 17', i.e. part of the optical path in one deflection line 6' each.

Figure 2:
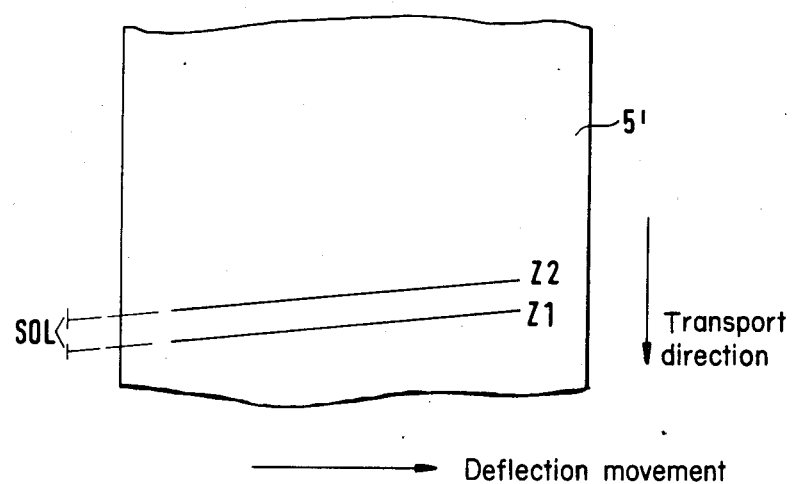
FIG. 2 is a diagram of the desired path of the scanning lines on the material web.

The material web 5' is transported with constant speed in transport direction by a drive roller pair 21 and a stepper motor 22—compare also FIG. 2. A speed and position control device generally designated by 23 framed, in FIG. 1, by interrupted lines, feeds to this end a pulse with a constant pulse frequency into stepper motor 22 which if necessary if synchronized by the clock generator 20.

By projecting the deflection movement of the beam 17' caused by the polygon mirror onto the moving web material 5', the latter may image-wisely be exposed (scanned) in a series of deflection lines Z1, Z2 passing rectilinearly and at a constant distance relative to each other, compare FIG. 2.

For triggering the image-wise exposure in each deflection line, a reference signal SOL for time and deflection position is generated at a predetermined location at the beginning of the deflection line using a light sensitive element 24 and a pulse former 25.

For image-wise exposure, a laser beam (not shown) is brightness-modulated by means of image spots by a typographic computer 26 including a modulator. To this end, typographic data, text and further data, are fed into the typographic computer from which data an image frequency (pixel frequency) is generated.

When processing the typographic data, particularly in case of smaller sizes of type, it might happen that the typographic computer is unable to provide completely calculated data and signals for the modulation of the laser beam for the next deflection line if the last scanning line, in case of a continuous advancing of the material web, is projected at the location provided therefor. To accommodate this, the transport of the material web is stopped by a stop signal which the typographic computer feeds into a synchronization device 28 via a line 27. From this results the problem to so start the material web again such that the following image-wise exposure in a projected (proposed) deflection line Z2 occurs in a predetermined position relative to the last-exposed deflection line Z1 and with a constant speed in a way as if there was no interruption of the transport.

To this end, the speed and position control device 23 comprises the synchronization device 28 which is fed, inter alia, with the reference signals SOL from pulse former 25, from which, by a zero mark pulse each, one is selected for each rotation of the polygon mirror. In this way, the same reflective face triggers again a selected reference signal when a predetermined deflection positon is reached. The synchronization device 28 feeds the selected reference signals into a reference signal counter (SOL counter) including a start/stop program section 29 via a line 30. the synchronization device may, in addition thereto, be fed via a line 31 by a control signal from the start/stop program section 29 and reference signal counter. By counting out a number of reference pulses corresponding to the number of reflective faces, alternatively to a logic disjunction with the zero mark, those reference pulses may be selected which are assigned to a defined reflective face. A signal on a release line 32 from the synchronization device 28 to the typographic computer 26 may release the modulated exposure along a deflection line following an interruption. One output of the start/stop program section 29 including reference signal counter is connected to one input of a forward-backward counter 33 for accelerating or retarding the material web. This device controls a frequency storage 34 which, in connection with the programmable clock generator 35, triggers, inter alia, a frequency variation for retardation and acceleration processes of step motor 22. From the increments, which for instance are generated by clock pulses of the constant generator 20, these units 34, 35 generate path increment pulses. the relationship between time and path pulses is adjusted to a linear change each preferably during the acceleration or retardation. The constant periods of speed during web transport or during return motion of the material web, are adjusted relative to each other by synchronization of the path increment pulses with the constant clock pulse. The programmable clock generator 35 is followed by a conventional rotary field control device 36 including a power stage 37. The respective field direction is also controlled by the program section 29 over line 38.

In the following explanation of the synchronization process by means of the apparatus shown in FIG. 1, reference is also made to FIG. 3.

During the image-wise exposure of the last deflection line, the typographic computer 26 states that it will not be in a position to provide the pixel modulation signals for the exposure along the following deflection completely and in time. It emits a stop signal via line 27 to the synchronization device prior to reference signal SOL of the first rotation of the polygon mirror. The rotations are in this case counted for the scanning interruption at each occurrence of a reference signal in the reference signal counter 29 comprising start/stop program section.

The start/stop program section 29 commands, at the reference signal of the first rotation via frequency storage 34 and programmable clock generator 35 that the step motor 22 be linearly slowed down during n time pulses until standstill. The r path increment pulses required are counted in the forward-backward counter 33. The material web has then surpassed, for a section S, the position of the next regular scanning position.

As from the reference signal for the 2nd rotation, this excess is cancelled in that the step motor 22, reversed by the rotary field direction control, is backwardly linearly accelerated until, after n clock pulses and, again, r path increment pulses, is accelerated to a return speed $-v_o$ which is equal in magnitude to the constant transport speed $+v_o$.

This constant return motion occurs beyond the reference signal for the third rotation up to the reference signal for the fourth rotation during (m−n) clock pulses plus m clock pulses, where m is the number of clock pulses between two reference signals, that is during a total of p clock pulses.

Subsequently, as from the reference signal for the fourth rotation, the step motor 22 is again linearly retarded up to standstill so that the material web takes a waiting position before the next reference signal.

The material web remains in this waiting position at least for any number of rotations x until the typographic computer 26 is prepared for an image-wise exposure along a next deflection line, which computer in this case emits a start signal to the synchronization device 28. The synchronization device subsequently issues the command for the next start of the step motor in the transport direction at the reference signal for the (x+1)th rotation which again is linearly accelerated by r path increment pulses to a constant transport speed. The step motor 22 and the drive elements (including drive roller pair 21) coupled to it may adjust during one time interval up to the reference signal of the (x+3)rd rotation to the constant transport speed so that the material web arrives with it in the scanning position at the reference signal of the (x+3)rd rotation, which is equal to the scanning position through which the material web passed at the reference signal SOL at the first rotation. For this point of time, the image-wise exposure along the deflection line is cleared by an exposure release signal on line 32.

Figure 3:
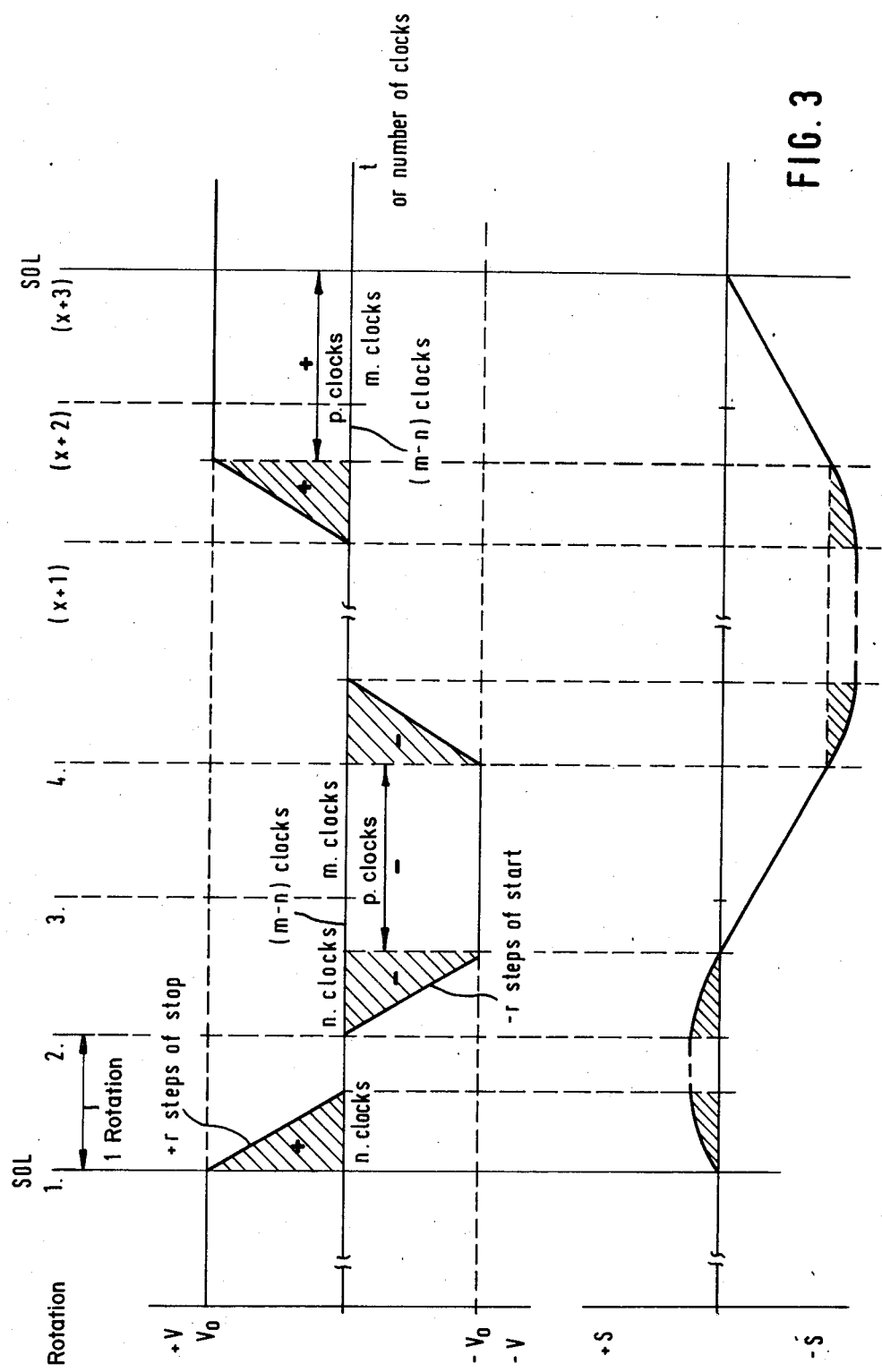
FIG. 3 shows time diagrams of the speed (v) and the position (s) of the material web in case of an interruption of the scanning.

From FIG. 3 it can be taken that the transport path required for the acceleration and adjustment of the transport speed between the reference signals for the (x+1)st rotation and the (x+3)rd rotation is equal to the return motion path between the reference signals for the 2nd and 3rd rotation. The slowing-down paths between the reference signals of the first and second rotation on one hand and the reference signals of the fourth and the following rotation, on the other, do mutually compensate.

What is claimed is:

1. A method for the synchronization of an approximately constant transport speed photosensitive material web in a phototypesetting process, wherein an optical path is deflected into deflection lines which are relatively transverse to the direction of motion of the material web and said web is scanned to expose an image while the web transport speed and the optical path deflection speed are controllable by common clock pulses and where at the beginning of each path deflection line a first reference signal (SOL) for time and deflection position is generated, the method comprising the steps of:
   in the case of an interruption of scanning image exposure, generating further reference signals while continuing line-wise deflection of the optical path;
   slowing down the movement of the material web beginning with a second selected reference signal after the interruption by n timing pulses to achieve standstill of the web;
   beginning with a third subsequent reference signal which is the second as from the interruption, accelerating the web by n timing pulses in a direction opposed to the original web transport direction to a speed equal to its original transport speed;
   subsequently resetting the movement of the web, by p timing pulses, at the original speed until beginning with a predetermined fourth subsequent reference signal, the web is retarded by n timing pulses to standstill; and
   after a variable interval up to a predetermined fifth subsequent reference signal, accelerating the web by n timing pulses to the original transport speed and subsequently, moving by p timing pulses at the original speed up to a predetermined sixth following reference signal at the occurrence of which the web moving with the original speed reaches a scanning position which is equal to the scanning position with the second selected reference signal.

2. A method for the synchronization according to claim 1, where the optical path is deflected into deflection lines by means of a polygon mirror comprising a plurality of reflective faces, wherein as the second reference signal, the signal is selected which is generated when, each time after one rotation of said polygon mirror, the same reflective face starts a deflection line by which said material web in the case of a scanning interruption was last scanned.

3. A method according to claim 1 wherein
said material web, in case of an interruption of the scanning in the retardation or acceleration phases is retarded or accelerated, respectively, with either a constant retardation or acceleration.

4. A method according to claim 2 wherein
said material web, in case of an interruption of the scanning in the retardation or acceleration phases is retarded or accelerated, respectively, with either a constant retardation or acceleration.

* * * * *